(12) United States Patent
Peeters et al.

(10) Patent No.: US 9,519,519 B2
(45) Date of Patent: Dec. 13, 2016

(54) SYSTEM AND METHOD FOR MANAGING WORKLOAD PERFORMANCE ON BILLED COMPUTER SYSTEMS

(71) Applicant: zIT Consulting GmbH, Jade (DE)

(72) Inventors: Johannes Gerardus Jozef Peeters, Jade (DE); Friedhelm Herbert Stoehler, Augsburg (DE); Horst Walter Doehler, Untermerzbach-Memmelsdorf (DE)

(73) Assignee: zIT Consulting GmbH, Augsburg (DE)

( * ) Notice: Subject to any disclaimer, the term of this patent is extended or adjusted under 35 U.S.C. 154(b) by 0 days.

(21) Appl. No.: 14/614,832

(22) Filed: Feb. 5, 2015

(65) Prior Publication Data
US 2015/0150021 A1  May 28, 2015

Related U.S. Application Data

(63) Continuation of application No. 14/478,062, filed on Sep. 5, 2014, now Pat. No. 8,978,037.

(60) Provisional application No. 61/874,052, filed on Sep. 5, 2013.

(51) Int. Cl.
*G06F 9/46* (2006.01)
*G06F 15/173* (2006.01)
*G06F 9/50* (2006.01)

(52) U.S. Cl.
CPC ............... *G06F 9/505* (2013.01); *G06F 9/46* (2013.01); *G06F 9/5077* (2013.01)

(58) Field of Classification Search
None
See application file for complete search history.

(56) References Cited

U.S. PATENT DOCUMENTS

| 7,228,546 | B1 |  | 6/2007 | McCarthy et al. |
| 7,395,537 | B1 | * | 7/2008 | Brown et al. ................ 718/104 |
| 7,640,342 | B1 | * | 12/2009 | Aharoni et al. ............. 709/226 |
| 7,752,623 | B1 |  | 7/2010 | Crawford, Jr. |
| 8,332,857 | B1 | * | 12/2012 | Brown et al. ................ 718/103 |
| 8,856,335 | B1 | * | 10/2014 | Yadwadkar et al. ......... 709/226 |
| 2002/0065907 | A1 |  | 5/2002 | Cloonan et al. |
| 2005/0066326 | A1 |  | 3/2005 | Herbeck et al. |
| 2007/0022425 | A1 | * | 1/2007 | Jackson ....................... 718/104 |
| 2009/0307508 | A1 | * | 12/2009 | Curtis et al. ................. 713/320 |
| 2010/0153958 | A1 | * | 6/2010 | Richards et al. ............ 718/104 |
| 2010/0162251 | A1 | * | 6/2010 | Richards et al. ............ 718/102 |
| 2012/0023492 | A1 | * | 1/2012 | Govindan et al. .............. 718/1 |
| 2013/0007753 | A1 | * | 1/2013 | Jain ............................. 718/103 |
| 2013/0139164 | A1 | * | 5/2013 | Balko .......................... 718/102 |
| 2013/0290972 | A1 |  | 10/2013 | Cherkasova et al. |
| 2014/0317691 | A1 |  | 10/2014 | Zombik et al. |

* cited by examiner

*Primary Examiner* — Adam Lee
(74) *Attorney, Agent, or Firm* — Allen Dyer Doppelt Milbrath & Gilchrist

(57) ABSTRACT

In a system and method for managing mainframe computer usage, preferred values for service class defined performance goals are determined to optimize workload performance in service classes across a logical partition. A method for managing mainframe computer system usage can include receiving a performance optimization goal for workload performance in a service class, the service class having a defined performance goal. Achievement of the performance optimization goal is assessed, and a preferred value for the defined performance goal is determined based on assessing achievement of the performance optimization goal. Workload criticality can be taken into account, and automatic changes to the performance goal authorized.

32 Claims, 6 Drawing Sheets

| Performance Optimization Goal | | | Capacity Shortage? | | Designated as Critical? | | Automatic Change? | | Action |
|---|---|---|---|---|---|---|---|---|---|
| Overachieving | Achieved | Underachieving | NO | YES | NO | YES | NO | YES | |
| X | | | X | | X | | X | | No Action |
| X | | | X | | X | | | X | No Action |
| X | | | X | | | X | X | | No Action |
| X | | | X | | | X | | X | No Action |
| X | | | | X | X | | X | | Determine Preferred Value and Send Notification |
| X | | | | X | X | | | X | Determine Preferred Value and Send Notification |
| X | | | | X | | X | X | | Determine Preferred Value and Send Notification |
| X | | | | X | | X | | X | Determine Preferred Value, Change Goal and Send Notification |
| | X | | | | | | | | No Action |
| | | X | X | | X | | X | | Send Notification |
| | | X | X | | X | | | X | Send Notification |
| | | X | X | | | X | X | | Determine Preferred Value, Change Goal and Send Notification |
| | | X | X | | | X | | X | Determine Preferred Value, Change Goal and Send Notification |
| | | X | | X | X | | X | | Determine Preferred Value and Send Notification |
| | | X | | X | X | | | X | Determine Preferred Value and Send Notification |
| | | X | | X | | X | X | | Determine Preferred Value and Send Notification |
| | | X | | X | | X | | X | Determine Preferred Value, Change Goal and Send Notification |

Fig. 7

| Performance Index | Other Parameter(S) | Preferred Value |
|---|---|---|
| <0.5 | Negative | Change goals to reflect a 10% higher goal<br>Example: Goal was 90% of the transactions within 0.01 seconds, new goal is 90% within 0.009 seconds |
| 0.6 | Negative | Change goals to reflect a 7.5% higher goal<br>Example: Goal was 90% of the transactions within 0.01 seconds, new goal is 90% within 0.00925 seconds |
| 0.7 | Negative | Change goals to reflect a 5% higher goal<br>Example: Goal was 90% of the transactions within 0.01 seconds, new goal is 90% within 0.0095 seconds |
| 0.8-1.2 | Negative | No changes |
| 1.2-2.0 | Negative | Change goals to reflect a 10% lower goal<br>Example: Goal was 90% of the transactions within 0.01 seconds, new goal is 90% within 0.011 seconds |
| >2.0 | Negative | Change goals to reflect a 20% lower goal<br>Example: Goal was 90% of the transactions within 0.01 seconds, new goal is 90% within 0.012 seconds |
| <0.5 | Positive | Change goals to reflect a 15% higher goal<br>Example: Goal was 90% of the transactions within 0.01 seconds, new goal is 90% within 0.0085 seconds |
| 0.6 | Positive | Change goals to reflect a 12.5% higher goal<br>Example: Goal was 90% of the transactions within 0.01 seconds, new goal is 90% within 0.00875 seconds |
| 0.7 | Positive | Change goals to reflect a 10% higher goal<br>Example: Goal was 90% of the transactions within 0.01 seconds, new goal is 90% within 0.009 seconds |
| 0.8-1.2 | Positive | No changes |
| 1.2-2.0 | Positive | Change goals to reflect a 15% lower goal<br>Example: Goal was 90% of the transactions within 0.01 seconds, new goal is 90% within 0.0115 seconds |
| >2.0 | Positive | Change goals to reflect a 30% lower goal<br>Example: Goal was 90% of the transactions within 0.01 seconds, new goal is 90% within 0.013 seconds |

Fig. 8 ical to 1.2 is
generally used as an indicator of satisfactory goal achievement, with PI values under 0.8 indicating overachievement
SYSTEM AND METHOD FOR MANAGING WORKLOAD PERFORMANCE ON BILLED COMPUTER SYSTEMS

CROSS-REFERENCE TO RELATED APPLICATION

This application claims the benefit of U.S. Non-provisional patent application Ser. No. 14/478,062 filed Sep. 5, 2014, which claims the benefit of U.S. Provisional Patent Application Ser. No. 61/874,052, filed on Sep. 5, 2013, the entire contents of which applications are herein incorporated by reference in their entirety.

FIELD OF THE INVENTION

The present invention relates to systems and methods for managing billed computer system usage, and more particularly, to optimizing workload performance through management of workload performance goals.

BACKGROUND OF THE INVENTION

Computer users requiring exceptional reliability, redundancy or security, such as very large corporations—and particularly financial sector corporations such as banks, exchanges, brokerages and the like—will often outsource computing needs to third party providers. The preeminent example of such a provider is the International Business Machines (IBM) corporation, which has several thousand users who pay a premium for the capability and reliability of its System z ("z" standing for "zero downtime") computing platform.

System z users have the benefit of multiple redundant mainframe computers that will continue to seamlessly execute users' workload despite the failure of individual machines. Each group of related computing functions being performed for a user is referred to as a logical partition (LPAR), which is executed by a given machine called a central electronic complex (CEC). The user can set usage limits for LPARs and for groups of LPARs. The present inventors have previously developed improved systems and methods for managing LPAR capacity limits to enhance system performance and control billable costs. An example of such systems and methods can be seen in U.S. Non-provisional patent application Ser. No. 14/199,364, filed on Mar. 6, 2014, the contents of which are herein incorporated by reference in their entirety.

In connection with assigning computing workload to LPARs, users define "service classes." When defining a service class, a user defines a workload importance level for the workload to be performed therein, as well as a performance goal. In the System z context, there are seven importance levels ranging from 0 (most important) through 6 (least important, also called "Discretionary"). The performance goal is defined in terms of certain performance parameters, such as a percentage of operations completed within a given time. An example of a defined performance goal would be 90% of transactions to be finished with 0.01 seconds clock time.

To allow further flexibility, a service class can include multiple divisions called "periods," assigned to different importance levels and having different defined performance goals. When workload is introduced into a multi-period service class, it automatically starts in the period with the highest importance level. If the workload exceeds a defined usage limit of the period in which it is currently running, it will be automatically transferred into the period having the next highest importance level. The usage limit is defined in terms of a usage parameter, such as time, processor cycles or the like. In general, multi-period service classes are used to allow shorter running workload to pass more quickly through the system without being unduly delayed by longer running workload assigned to the same service class.

The System z operating system (z/OS) includes a Workload Manager (WLM) for each LPAR which manages service class workload with the LPAR based on importance level, and which also monitors achievement of the defined performance goal. A performance index (PI) is measured for each defined performance goal by z/OS based on the performance parameters in terms of which the goal is defined. A PI of 1.0 indicates that a given defined performance goal is being exactly met, although a range of 0.8 to 1.2 is generally used as an indicator of satisfactory goal achievement, with PI values under 0.8 indicating overachievement (i.e., the performance goal is exceeded) and values over 1.2 indicating underachievement (i.e., the performance goal is not achieved).

Referring to FIG. 1, a chart graphically illustrates the relationship between service classes and WLM importance levels. As can be seen, some of the service classes have multiple periods (e.g., the service classes DDFPROD and DDFTEST—while it is common for a multi-period service class to have only two periods, a service class could include more than two periods). Each service class or period thereof has a defined performance goal, which the WLM monitors achievement of based on the PI.

Significantly, when an LPAR is capacity-limited, the WLM will allocate capacity between service classes (and periods thereof) based upon the PI. In the case of overachievement, the WLM will reduce allocated capacity to the overachieving service class or period in view of a service class or period with a PI indicating underachievement. In the case of a service class/period that is experiencing continuous underachievement in a capacity-limited situation, the WLM is configured to stop allocating more capacity thereto. The logic underlying this configuration being that the defined performance goal of the service class/period simply cannot be achieved with a reasonable allocation of capacity.

A performance goal is normally defined by a user when a service class is created. While a user could manually change the defined performance goals later, this is rarely done. While the WLM will change allocated capacity based on the PI, it does not ever change the defined performance goal. Sub-optimal goal definitions can lead to undesirable results. For instance, the overachievement case described above can effectively result in higher importance workload being slowed down in favor or less important workload in another service class/period. The persistent underachievement case can effectively result in the WLM "giving up" on the affected service class/period.

While features like service class definitions and the WLM importance levels allow billed computer system users some flexibility to manage workload performance on LPARs, further improvements are possible.

SUMMARY OF THE INVENTION

In view of the foregoing, it is an object of the present invention to provide an improved system and method for managing workload performance on billed computer systems.

In a system and method for managing mainframe computer usage according to the present invention, preferred values for service class defined performance goals are determined to optimize workload performance in service classes across a logical partition. According to one method aspect, a method for managing mainframe computer system usage includes receiving a first performance optimization goal for workload performance in a first service class, the first service class having a first defined performance goal. Achievement of the first performance optimization goal is assessed, and a first preferred value for the first defined performance goal is determined based on assessing achievement of the first performance optimization goal.

According to further aspects, a first notification including the first preferred value is generated. The notification can include a request to change the first defined performance goal to match the first preferred value. Automatic changes can also be authorized, and implemented depending on other factors such as capacity shortages of an associated logical partition and workload performance criticality. The method can be applied to single- and multiple-period service classes, and repeated iteratively while workload is being performed on the mainframe computer system.

According to another method aspect, a method for managing mainframe computer system usage includes receiving, for workload to be performed in each of a plurality of service classes having a respective plurality of defined performance goals: a performance optimization goal for workload performance; and a workload criticality designation, indicating that workload performance is critical or not critical. An automatic change authorization is also received, indicating that automatic changes to the respective defined performance goals are or are not authorized. Achievement of the respective plurality of performance optimization goals is assessed to identify achievement, underachievement or overachievement thereof. For each of the plurality of service classes, based on the assessed achievement, the workload criticality designation and the automatic change authorization, it is determined whether any action is to be taken in connection with the respective defined performance goal.

According to an additional aspect of the present invention, a tangible data storage medium is encoded with program instructions to perform the methods and systems of the present invention when executed by a computer system.

These and other objects, aspects and advantages of the present invention will be better appreciated in view of the drawings and following detailed description of preferred embodiments.

BRIEF DESCRIPTION OF THE DRAWINGS

FIG. 1 is a graphical illustration of services classes and workload importance levels definitions associated therewith;

FIG. 6 is the graphical illustration of FIG. 1, additionally reflecting workload performance criticality designations;

FIG. 7 is a decision table illustrating possible outcomes of an iteration of the performance monitoring and optimization phase of FIG. 5, based on settings received in the configuration phase of FIG. 4; and FIG. 8 is an exemplary table illustrating the determination of preferred values for defined performance goals, when such determination is dictated by the outcomes of FIG. 7.

DETAILED DESCRIPTION OF PREFERRED EMBODIMENTS

As discussed above, the IBM System z platform is the preeminent contemporary example of third party-provided computing services. Thus, the following description will be couched in terms relevant to this example. However, those skilled in the art will appreciate that the present invention could be applied to manage workload on other billed computer systems, in which workload is assigned to classes or other divisions for which performance goals are defined and monitored in connection with capacity management.

Figure 2:
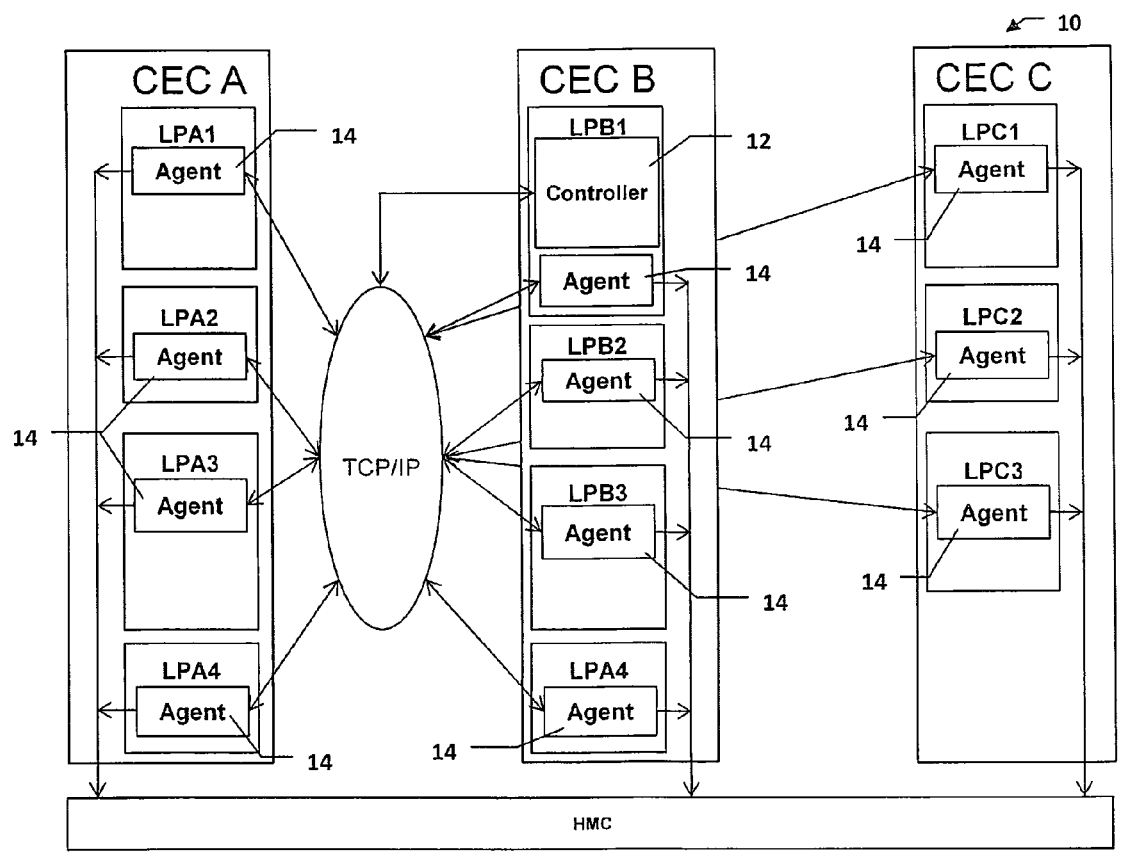
FIG. 2 is a schematic overview of a system for managing mainframe computer usage according to an embodiment of the present invention, including a performance management controller and a plurality of management system agents executed by central electronic complexes (CECs) of a mainframe computer system.

According to an illustrative embodiment of the present invention, with reference to FIG. 2, a user is having workload executed by a plurality of logical partitions (LPARs-LPA1, LPA2 . . . LPC3) running on plurality of third-party mainframe computers (CEC A, CEC B, CEC C). A system 10 for managing workload performance is implemented via a management system controller 12 executed by one of the LPARs (LPB1 in the depicted example) and a plurality of management system agents 14 running on each of the LPARs. Data is exchanged between the system controller 12 and agents 14 using appropriate communications protocols (e.g., TCP/IP). A hardware management console (HMC) allows the controller 12 to implement management changes via the agents 14. In IBM System z, the agents 14 access the HMC via a base control program internal interface (BCPii).

Figure 3:
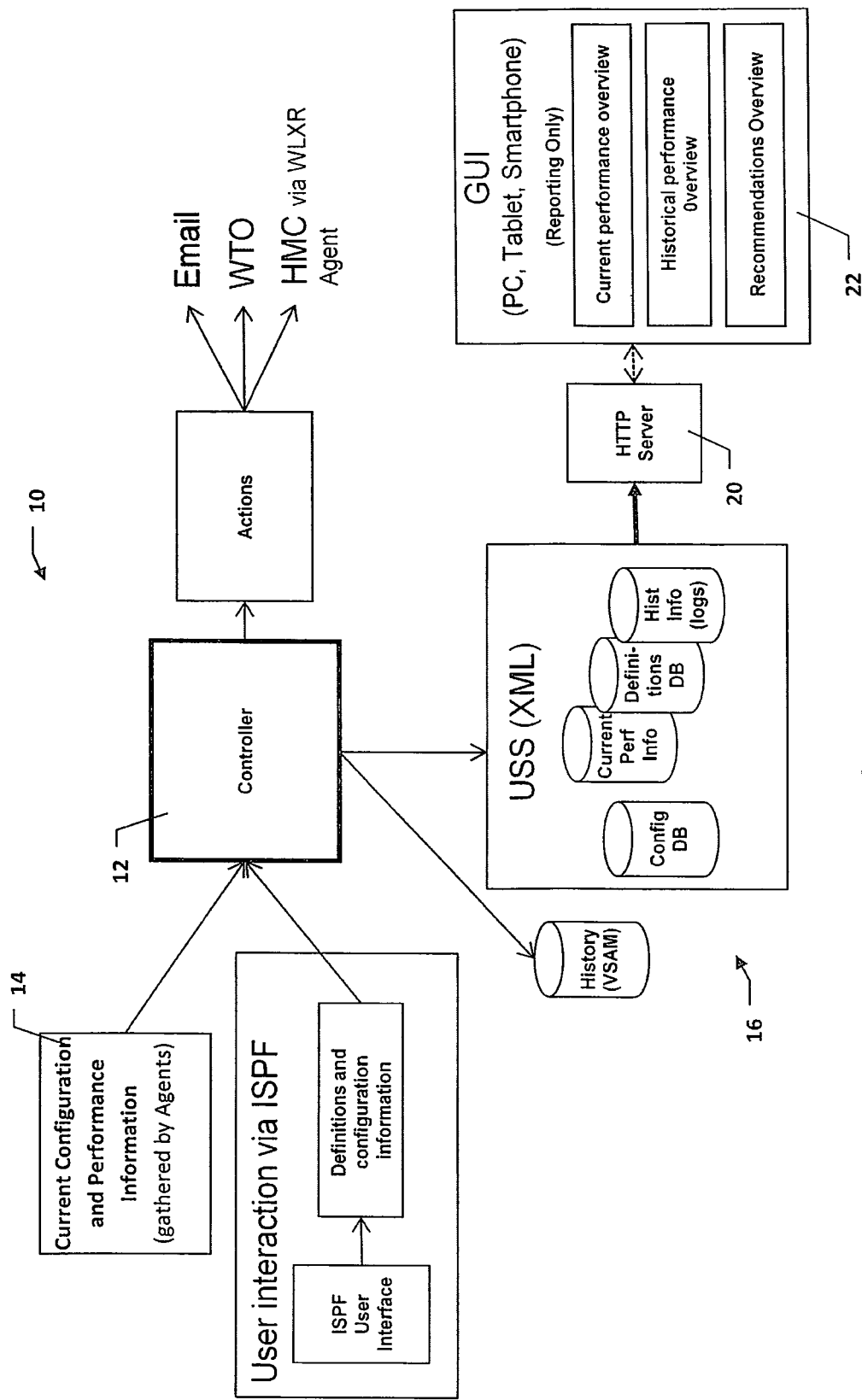
FIG. 3 is a schematic overview of functional interactions involving the performance management controller of FIG. 2.

Referring also to FIG. 3, the management system controller 12 receives information on existing service classes/periods and corresponding definition and configuration information from the interactive system productivity facility (ISPF). ISPF generates the interface by which users define and configure service classes, and receives and stores these inputs. The agents 14 supply the controller 12 with information on current service class configuration and performance information. For each service class/period, this information includes the performance index (PI) monitored by the work load manager (WLM) based on the respective defined performance goal, but preferably includes additional performance parameters that may be separate from those upon which the defined performance goal is based. Non-limiting examples include indications of processing capacity being used (e.g., activity in millions of service units (MSU)) and speed of workload execution (e.g., input from a Delay Counter) and number of workload entities (e.g. online transactions) executed per second.

In connection with the system 10, users can also define performance optimization goals for each service class or period thereof including not only the parameter(s) used to assess achievement of the defined performance goal, but based on additional parameters, information regarding which would be gathered by the agents 14, as described above. The use of performance optimization goals based on a combination of parameters allows for a more accurate determination of service class workload performance. The ISPF can be used to allow the user to determine the performance parameters to be used and set performance optimization goals based thereon.

The management controller 12 evaluates the achievement of the performance optimization goals based upon the usage information received from the agents 14, and determines, for each service class/period, whether action should be taken with respect to the defined performance goal. This determination will be explained in greater detail below. When action is taken, such action preferably includes sending notifications to the user and/or determining and implementing defined performance goal changes. Notifications can be sent via a write-to-operator (WTO) message, an email, or other message type. Goal changes are implemented via the respective agent 14 via the HMC. In addition to outputting notifications and/or changes, the management controller 12 stores its inputs and outputs in databases 16. A web server 20 offers a reporting interface 22 via which users can generate reports on current and historical performance and management actions.

The method of managing workload performance includes a configuration phase (shown in FIG. 4), in which performance optimization goals and management preferences are defined for the service class, and a performance monitoring and optimization phase (shown in FIG. 5), in which performance optimization goal achievement is periodically assessed in order to determine what, if any, action(s) should be taken. As a preliminary step to a first implementation of the method, the software necessary to execute the system 10 components is installed by the user on the CECs.

With the necessary software installed, configuration starts at block 100 for a first service class or period thereof. At block 102, a performance optimization goal is received, which is distinct from the defined performance goal for that service class/period, although it may share one or more performance parameters therewith. As discussed above, the performance optimization goal is preferably based on at least one separate performance parameter, as well as a shared parameter. In setting the performance optimization parameters, the user can be allowed to specify the parameters, themselves, in addition to threshold values therefor.

Figures 1, 6:
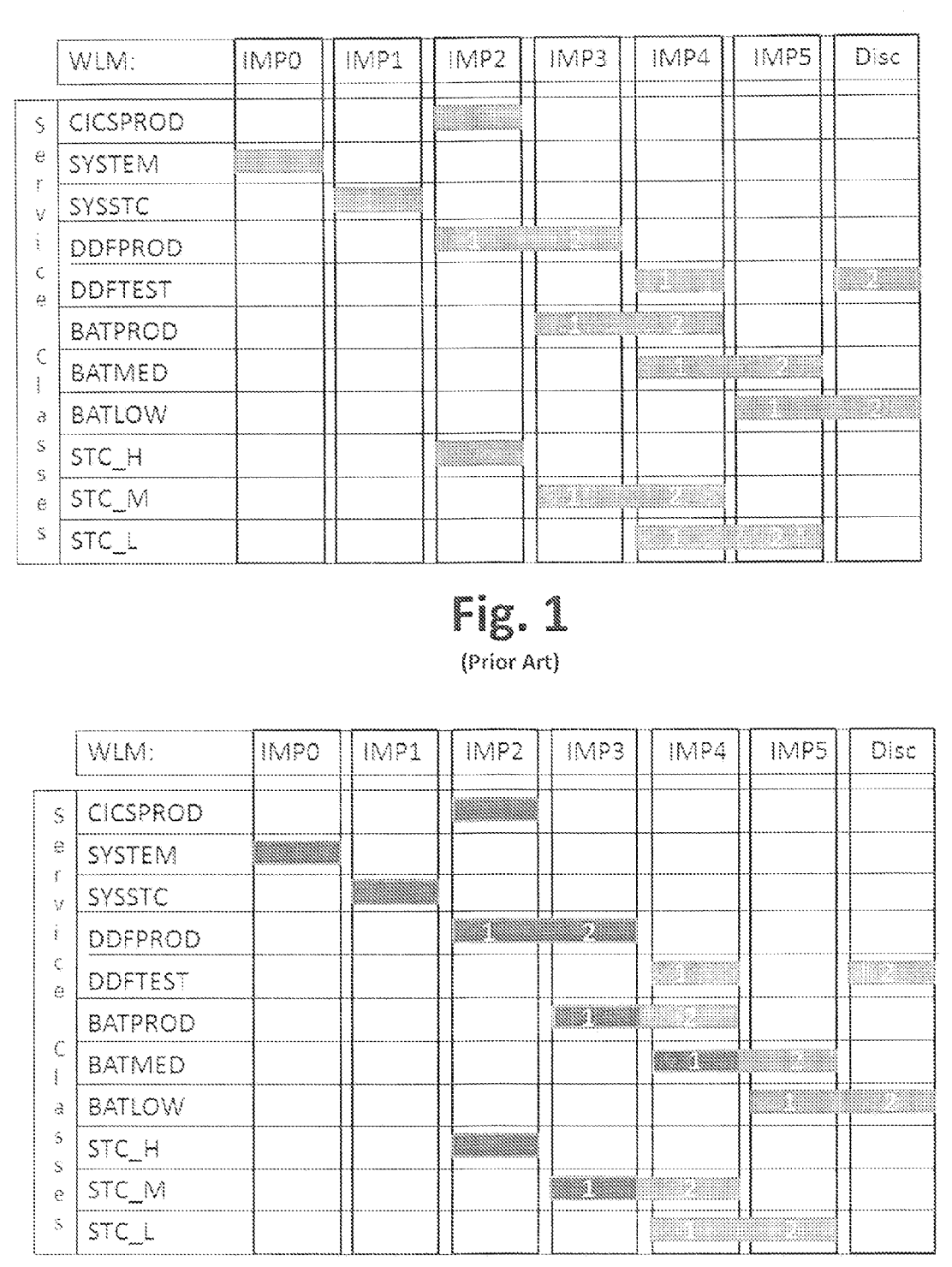

At block 104, a workload criticality designation is received, which indicates whether workload being performed in the respective service class/period is critical or not. This designation allows a user to set performance goals while distinguishing between service classes/periods where it is critical that the goal be met, as opposed to others for which the goal is desirable but failing to meet the goal is of less consequence. The criticality designation is used in determining whether action is necessary, as will be described in greater detail below. A graphic illustration of the significance of criticality designations can be seen in FIG. 6, which reproduces FIG. 1 except that service classes or periods thereof designated to be critical are more darkly shaded. Advantageously, criticality designations can have time-based criteria. For example, batch workload can be critical during certain night time hours, but not critical during the day.

A typical System z user would ordinarily be running multiple LPARs, each of which included a plurality of service classes. Thus, the actions of blocks 102-104 can be repeated until performance optimization goals, workload criticality designations and automatic change authorizations have been received for every service class or period thereof (block 110).

Either before or after receiving the optimization goals and criticality indications for the service classes, an automatic change authorization is received at block 110. The automatic change authorization allows a user to specify whether the performance management system is permitted to automatically implement changes to the defined performance goal for the service classes/periods. Without authorization being given for automatic changes, specific permission to implement a recommended change will always be required. The configuration phase ends at block 112. A user would preferably be permitted to revisit the configuration phase, were it desired to change settings for any service class or period thereof.

Figure 5:
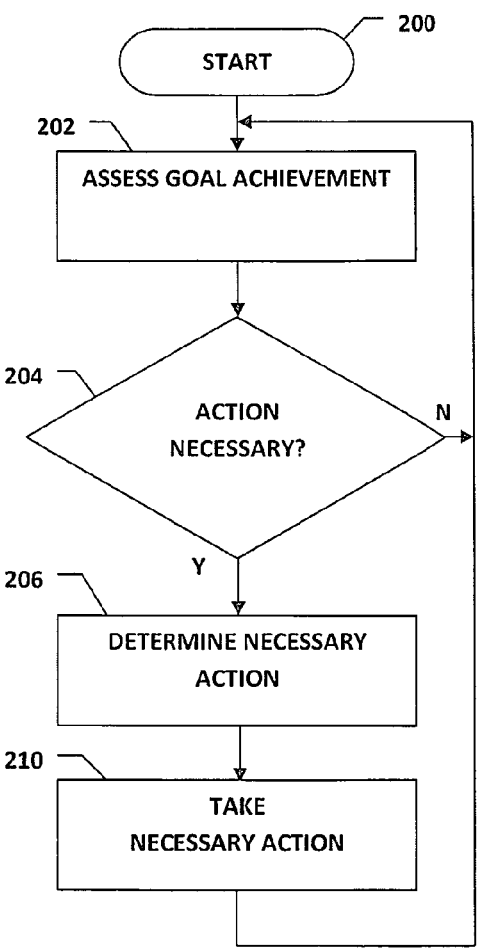
FIG. 5 is a flow diagram of a performance monitoring and optimization phase of a method of managing workload performance.

Referring to FIG. 5, the performance monitoring and optimization phase begins at block 200. Preferably, once the optimization goals and other settings have been configured for all the service classes, the monitoring and optimization phase runs continuously for every service class/period while workload is being executed. For economy of illustration, however, only one iteration of the monitoring and optimization phase is described for a given service class or period thereof. An advantageous interval between iterations is five minutes. With reference to the appended claims, it should be noted that a reference to a service class or to goals, definitions and/or settings thereof could generically refer to either a single period service class or to a multi-period service class—with the understanding that each of the multiple periods would have its own respective goals and other definitions and/or settings—unless further specified.

At block 202, achievement of the performance optimization goal is assessed. As discussed above, the performance optimization goal for a given service class/period preferably shares parameters with the defined performance goal for that service class or period thereof. Thus, the performance index (PI) determined by z/OS for the service class/period can be used to determine whether, with respect to the shared parameters, workload performance indicates achievement within an acceptable range, overachievement or underachievement. With respect to the separate parameters, other performance information is used to determine whether workload performance is positive (i.e., meets or exceeds) or negative (i.e., fails to meet) thresholds set for such parameters.

Based on the assessment of performance optimization goal achievement, a determination is made whether any further action is necessary at block 204. If no action is determined to be necessary, then the method simply returns to block 202 to await the next assessment. If action is determined to be necessary at block 204, then the necessary action is determined (block 206) and taken (block 210). After the action is taken, the method again returns to block 202 until the next assessment.

Figure 4:
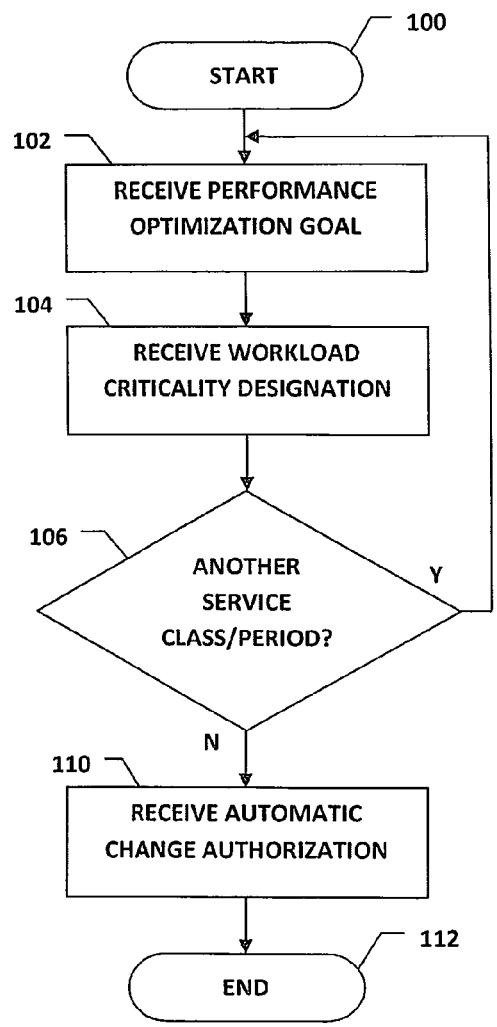
FIG. 4 is a flow diagram of a configuration phase of a method of managing workload performance.

Referring to FIG. 7, the determination of whether action is to be taken in steps 204 and 206 depends on the assessment of performance goal achievement, as well as on the additional setting specified for the service class/period in the configuration phase (see FIG. 4). FIG. 7 illustrates, for a given iteration of the method for a given service class or period thereof, how the different pertinent factors affect the determination of the action to be taken. In addition to goal achievement status (underachieved, achieved, or overachieved), the existence of a capacity shortage on the respective LPAR, the workload criticality designation and the automatic change authorization can all come into play. As can be seen, the simplest case is where the assessment indicates goal achievement. In this case, no action is taken, regardless of the other factors.

If overachievement is indicated, then whether or not there is a capacity shortage on the LPAR executing the service class/period in question is significant. The existence of a capacity shortage could be judged preemptively, based upon a proximity to a capacity limit and/or a predictive model indicating a likelihood of capacity meeting its limit within a predetermined time period, or actually based on the present existence of limited capacity. If there is no capacity shortage for the LPAR executing the overachieving service glass, then no action is taken, regardless of the other factors.

On the other hand, if a capacity shortage is determined to exist, then a preferred value for the defined performance goal for the service class/period will be determined, and notification will be generated including the preferred value. If the overachieving service class/period is not designated as critical, then the defined performance goal will not be changed to match the preferred value, regardless of automatic change authorization status. If the overachieving service class/period is designated as critical, then the defined performance goal will be automatically changed if automatic changes are authorized. In cases where the notification is sent with the preferred value, but an automatic change is not made, the notification can allow the user to authorize the change. Upon receipt of such authorization, the defined performance goal would be changed to match the preferred value.

When underachievement is indicated, then a notification will be sent regardless of the status of the other factors. If there is not a capacity shortage and the workload performance is not critical, then the notification will simply note the underachievement and a preferred value need not be generated or communicated. However, if workload performance is critical, then a preferred value will be generated for the defined performance goal even absent a capacity shortage, and, if automatic changes are authorized, the change to the preferred value will be automatically implemented. In the case of underachievement with a capacity shortage identified, then a preferred value will generated and sent with the notification, regardless of workload criticality. An automatic change will again only be implemented in the case where the service class/period workload performance is designated as critical and automatic changes are authorized.

Referring to FIG. 8, the preferred interplay between the PI and the other performance parameters in determining a preferred value for the defined performance goal for the service class/period is illustrated. Where the PI indicates an acceptable range of achievement (e.g, 0.8-1.2), the preferred value would not change regardless of whether the other performance parameter(s) was/were met. In general, where the PI indicates overachievement (e.g., less than 0.8), then the preferred value will reflect a "harder" goal and where the PI indicates underachievement (e.g., greater than 1.2), then the preferred value with reflect an "easier" goal. The direction of change of the preferred value relative to the current defined performance goal (i.e., harder or easier) is independent of whether the other performance parameter(s) were met. However, for a given range of under- or over-achievement, the magnitude of change represented by the preferred value relative to the current goal will vary depending on whether the assessment of the other performance parameter(s) is/are positive or negative. In either case, a positive assessment will result in a larger magnitude of change.

From the foregoing, it will be appreciated that the present invention offers automatic, dynamic notification and adjustment of workload performance bottlenecks, thereby reducing negative performance impacts of non-optimal settings in service classes. The present system and method further allow such adjustment to take into consideration the question if workload being is time critical or not, further enhancing the effectiveness of workload definitions and capacity adjustment.

The above embodiments and provided for illustrative and exemplary purposes; the present invention is not necessarily limited thereto. Rather, those skilled in the art will appreciate that these various modifications, as well as adaptations to particular circumstances, will fall within the scope of the invention as herein shown and described and of the claims appended hereto.

What is claimed is:

1. A method for managing mainframe computer system usage comprising:
   implementing a plurality of logical partitions on the mainframe computer system, each of the plurality of logical partitions executing a plurality of workload tasks in a plurality of service classes, one of the plurality of logical partitions executing a management system controller and each of the plurality of logical partitions executing a management system agent;
   receiving a first performance optimization goal for performance of the plurality of workload tasks in a first service class of the plurality of services classes, the first service class having a first defined performance goal;
   assessing achievement of the first performance optimization goal;
   determining a first preferred value for the first defined performance goal based on assessing achievement of the first performance optimization goal;
   generating a first notification including the first preferred value;
   changing the first defined performance goal to match the first preferred value; and
   managing performance of the plurality of workload tasks in the first service class of the first logical partition according to the changed first defined performance goal;
   wherein the first performance optimization goal is determined using at least one separate performance parameter that is not a performance parameter of the first defined performance goal;
   wherein the first service class includes first and second service class periods, the first defined performance goal including separate first defined performance goals for the first and second service class periods;
   wherein receiving the first performance optimization goal for workload performance in the first service class includes receiving separate first performance optimization goals for the first and second service class periods;
   wherein assessing achievement of the first performance optimization goal includes assessing achievement of the separate first performance optimization goals for the first and second service class periods, respectively; and
   wherein determining the first preferred value includes determining separate first preferred values for the first and second service class periods based upon the respective achievement assessments.

2. The method of claim 1, wherein the first notification further includes a request to change the first defined performance goal to match the first preferred value.

3. The method of claim 2, further comprising:
   receiving an affirmative response to the request to change the first defined performance goal; and
   wherein changing the first defined performance goal to match the first preferred value is performed in response to the receipt of the affirmative response.

4. The method of claim 1, wherein changing the first defined performance goal to match the first preferred value includes automatically changing the first defined performance goal to match the first preferred value when the first preferred value is different therefrom.

5. The method of claim 4, wherein the first notification includes a report that the first defined performance goal was automatically changed.

6. The method of claim 4, further comprising:
receiving an automatic change authorization;
wherein, when the first defined performance goal is different than the first preferred value, the first defined performance goal is not automatically changed without the automatic change authorization.

7. The method of claim 4, further comprising:
receiving a workload criticality designation for the first service class;
wherein, when the first defined performance goal is different than the first preferred value, the first defined performance goal is not automatically changed unless the workload criticality designation indicates that the workload performance of the first service class is critical.

8. The method of claim 4, further comprising:
determining whether a logical partition including the first service class is experiencing a processing capacity shortage;
wherein, when the first defined performance goal is different than the first preferred value, the first defined performance goal is not automatically changed unless:
the logical partition is experiencing a capacity shortage; and
the first performance optimization goal is assessed to be underachieved.

9. The method of claim 1, further comprising receiving separate workload criticality designations for the first and second service class periods of the first service class.

10. The method of claim 1, further comprising:
receiving a second performance optimization goal for workload performance in a second service class of the first logical partition executed by the mainframe computer system, the second service class having a second defined performance goal;
assessing achievement of the second performance optimization goal; and
determining a second preferred value for the second defined performance goal based on assessing achievement of the second performance optimization goal.

11. The method of claim 1, wherein the first performance optimization goal and the first defined performance goal are also determined using at least one shared performance parameter.

12. The method of claim 11, wherein assessing achievement of the first performance optimization goal includes monitoring:
a performance index indicative of the at least one shared performance parameter; and
other performance data indicative of the at least one separate performance parameter.

13. The method of claim 12, wherein, when the performance index indicates underachievement or overachievement outside an acceptable range, the first preferred value will represent a greater change to the first defined performance goal if the other performance data is positive rather than negative.

14. The method of claim 13, wherein, when the performance index indicates no underachievement or overachievement outside an acceptable range, no change to the first defined performance goal is recommended or made, regardless of the other performance data.

15. A tangible, non-transitory data storage medium encoded with program instructions to perform the method of claim 1 when executed by a computer system.

16. A method for managing mainframe computer system usage comprising:
implementing a plurality of logical partitions on the mainframe computer system, each of the plurality of logical partitions executing a plurality of workload tasks in a plurality of service classes, one of the plurality of logical partitions executing a management system controller and each of the plurality of logical partitions executing a management system agent;
receiving, for the plurality of workload tasks to be performed in each of a plurality of service classes, the plurality of service classes having a respective plurality of defined performance goals:
a performance optimization goal for workload performance; and
a workload criticality designation, indicating that workload performance is critical or not critical;
receiving an automatic change authorization, indicating that automatic changes to the respective defined performance goals are or are not authorized;
assessing achievement of the respective plurality of performance optimization goals to identify achievement, underachievement or overachievement thereof;
determining for each of the plurality of service classes, based on the assessed achievement, the workload criticality designation and the automatic change authorization, whether a preferred value is to be determined or automatically set for the respective defined performance goal;
changing the respective defined performance goal to match the preferred goal in each of the plurality of service classes for which the preferred goal is determined; and
managing performance of the plurality of workload tasks in each of the plurality of service classes for which the respective defined performance goal is changed according to the changed first defined performance goal;
wherein at least one of the performance optimization goals is determined using one separate performance parameter that is not a performance parameter of the respective defined performance goal.

17. The method of claim 16, further comprising:
determining whether a capacity shortage exists for a logical partition executing the plurality of service classes;
wherein determining for each of the plurality of service classes whether a preferred value is to be determined or automatically set for the respective defined performance goal is further based on the capacity shortage determination.

18. The method of claim 17, wherein determining for each of the plurality of service classes whether a preferred value is to be determined or automatically set for the respective defined performance goal includes determining no action is to be taken if achievement of the respective defined performance goal is identified.

19. The method of claim 17, wherein determining for each of the plurality of service classes whether a preferred value is to be determined or automatically set for the respective defined performance goal includes determining no action is to be taken if overachievement of the respective defined performance goal is identified and no capacity shortage is determined to exist for the logical partition executing the plurality of service classes.

20. The method of claim 17, wherein determining for each of the plurality of service classes whether a preferred value is to be determined or automatically set for the respective defined performance goal includes determining a preferred value for the respective defined performance goal if overachievement of the respective defined performance goal is identified and a capacity shortage is determined to exist for the logical partition executing the plurality of service classes.

21. The method of claim 20, wherein determining for each of the plurality of service classes whether a preferred value is to be determined or automatically set for the respective defined performance goal further includes generating a notification including the preferred value if overachievement of the respective defined performance goal is identified and a capacity shortage is determined to exist for the logical partition executing the plurality of service classes.

22. The method of claim 21, wherein the notification further includes a request to change the respective defined performance goal to match the preferred value.

23. The method of claim 21, wherein determining for each of the plurality of service classes whether a preferred value is to be determined or automatically set for the respective defined performance goal further includes automatically changing the respective defined performance goal to match the preferred value if overachievement of the respective defined performance goal is identified, a capacity shortage is determined to exist for the logical partition executing the plurality of service classes, the workload performance is indicated to be critical and automatic changes are authorized.

24. The method of claim 17, wherein determining for each of the plurality of service classes whether a preferred value is to be determined or automatically set for the respective defined performance goal includes generating a notification if underachievement of the respective defined performance goal is identified.

25. The method of claim 24, wherein determining for each of the plurality of service classes whether a preferred value is to be determined or automatically set for the respective defined performance goal further includes determining a preferred value for the respective defined performance goal if underachievement of the respective defined performance goal is identified and a capacity shortage is determined to exist for the logical partition executing the plurality of service classes.

26. The method of claim 24, wherein determining for each of the plurality of service classes whether a preferred value is to be determined or automatically set for the respective defined performance goal further includes determining a preferred value for the respective defined performance goal if underachievement of the respective defined performance goal is identified and the workload performance is indicated to be critical.

27. The method of claim 26, wherein determining for each of the plurality of service classes whether a preferred value is to be determined or automatically set for the respective defined performance goal further includes automatically changing the respective defined performance goal to match the preferred value if underachievement of the respective defined performance goal is identified, the workload performance is indicated to be critical and automatic changes are authorized.

28. The method of claim 16, wherein the at least one of the performance optimization goals and the respective defined performance goal are also determined using at least one shared performance parameter.

29. The method of claim 28, wherein assessing achievement of the respective plurality of performance optimization goals to identify achievement, underachievement or overachievement thereof includes determining the at least one shared performance parameter.

30. The method of claim 29, wherein determining for each of the plurality of service classes whether a preferred value is to be determined or automatically set for the respective defined performance goal includes determining a preferred value for the respective defined performance goal if overachievement or underachievement of the respective defined performance goal is identified.

31. The method of claim 30, wherein, for a given degree of overachievement or underachievement, a magnitude of the preferred value will vary depending on a determination of the at least one separate performance parameter.

32. A tangible, non-transitory data storage medium encoded with program instructions to perform the method of claim 16 when executed by a computer system.

* * * * *